US008039982B2

(12) United States Patent
Scholte-Wassink

(10) Patent No.: US 8,039,982 B2
(45) Date of Patent: Oct. 18, 2011

(54) METHOD FOR OPERATING A WIND TURBINE, COIL ARRANGEMENT FOR AN ELECTRIC MACHINE, AND CONTROLLER FOR A WIND TURBINE

(75) Inventor: Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/826,023

(22) Filed: Jun. 29, 2010

(65) Prior Publication Data
US 2011/0140421 A1    Jun. 16, 2011

(51) Int. Cl.
*H02P 9/14* (2006.01)
(52) U.S. Cl. ............................................. 290/44; 322/59
(58) Field of Classification Search .................... 290/43, 290/44, 55; 322/59, 37
See application file for complete search history.

(56) References Cited

U.S. PATENT DOCUMENTS

| 7,227,340 | B2 * | 6/2007 | Chen ............................... 322/24 |
| 7,348,764 | B2 * | 3/2008 | Stewart et al. .................. 322/24 |
| 7,656,135 | B2 * | 2/2010 | Schram et al. .................. 322/59 |

* cited by examiner

*Primary Examiner* — Nicholas Ponomarenko
(74) *Attorney, Agent, or Firm* — Global Patent Operation; Douglas D. Zhang

(57) ABSTRACT

The disclosure concerns a method for operating a wind turbine having a generator, the generator having for each phase a plurality of coils, wherein the plurality of coils of each phase includes at least one group of coils including at least two coils, the group of coils including at least two subgroups including at least one coil, wherein the generator has a first state in which the coils of the group of coils are electrically connected in series, and, the generator has a second state in which the at least two subgroups are switched electrically in parallel; the method including: changing the state of the generator. Further, the disclosure concerns a coil arrangement for an electric machine for a wind turbine, the electrical machine having for each phase a plurality of coils, wherein the plurality of coils of each phase includes at least one group of coils including at least two coils, the group of coils including at least two subgroups including at least one coil, wherein the electrical machine has a first state in which the coils of the group of coils are electrically connected in series, and, the electrical machine has a second state in which the at least two subgroups are switched electrically in parallel.

20 Claims, 7 Drawing Sheets

METHOD FOR OPERATING A WIND TURBINE, COIL ARRANGEMENT FOR AN ELECTRIC MACHINE, AND CONTROLLER FOR A WIND TURBINE

The present disclosure relates to method for operating a wind turbine. Additionally, the disclosure relates to a coil arrangement for an electric machine, and controller for a wind turbine.

BACKGROUND OF THE INVENTION

Wind turbines may use a permanent magnet generator as well as an electrically excited synchronous and/or an asynchronous generator. Generators have in some embodiments one or more stator windings in which a rotating magnetic field of the rotor induces a voltage. Typically, the induced voltage is proportional to the rotational speed of a rotor of the generator and is also proportional to the field of the permanent magnets. Wind turbines may use a permanent magnet generator instead of an electrically excited synchronous or asynchronous generator to improve the system efficiency, in particular at partial load, and, in some embodiments, the annual energy production (AEP) of the wind turbine is increased. Generators have in some embodiments one or more stator windings in which a rotating magnetic field of the magnets, in particular the permanent magnets, induce a voltage.

In typical usage, the generator of a wind turbine is electrically connected to a grid, in particular via inverters. Typically, grid operators require a minimum voltage to be supplied to the grid so that, in case, the generated current is above said minimum voltage, the wind turbine is connected to the grid.

For example, inverters of a wind turbine may only be operated in a predetermined operation range of rotational speed. Thus, during operation, the output voltage of the generator may fit into the input operating range of the inverter or converter. Typically, the output voltage of a generator depends on the rotational speed of the rotor of the generator, in particular in case of a permanent magnet generator. As the wind speed can not be controlled, and thus the rotational speed of the wind rotor of the wind turbine, the time in which the wind turbine may be connected to a grid depends on the wind speed. Further, at high rotational speeds of the wind rotor, high voltages are typically generated by the generator. Typically, the higher voltages the higher may be the iron losses of the rotor.

BRIEF DESCRIPTION OF THE INVENTION

In view of the above, method for operating a wind turbine having a generator is provided, the generator having for each phase a plurality of coils, wherein the plurality of coils of each phase includes at least one group of coils including at least two coils, the group of coils including at least two subgroups including at least one coil, wherein the generator has a first state in which the coils of the group of coils are electrically connected in series, and, the generator has a second state in which the at least two subgroups are switched electrically in parallel; the method including: changing the state of the generator.

According to a further aspect, a coil arrangement for an electric machine for a wind turbine is provided, the electrical machine having for each phase a plurality of coils, wherein the plurality of coils of each phase includes at least one group of coils including at least two coils, the group of coils including at least two subgroups including at least one coil, wherein the electrical machine has a first state in which the coils of the group of coils are electrically connected in series, and, the electrical machine has a second state in which the at least two subgroups are switched electrically in parallel.

According to a further aspect, a controller for a wind turbine is provided, the wind turbine including a generator, the generator having for each phase a plurality of coils, wherein the plurality of coils of each phase includes at least one group of coils including at least two coils, the group of coils including at least two subgroups including at least one coil, wherein the generator has a first state in which the coils of the group of coils are electrically connected in series, and, the generator has a second state in which the at least two subgroups are switched electrically in parallel; wherein the controller is adapted to generate a signal for changing the state of the generator.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Figure 1:
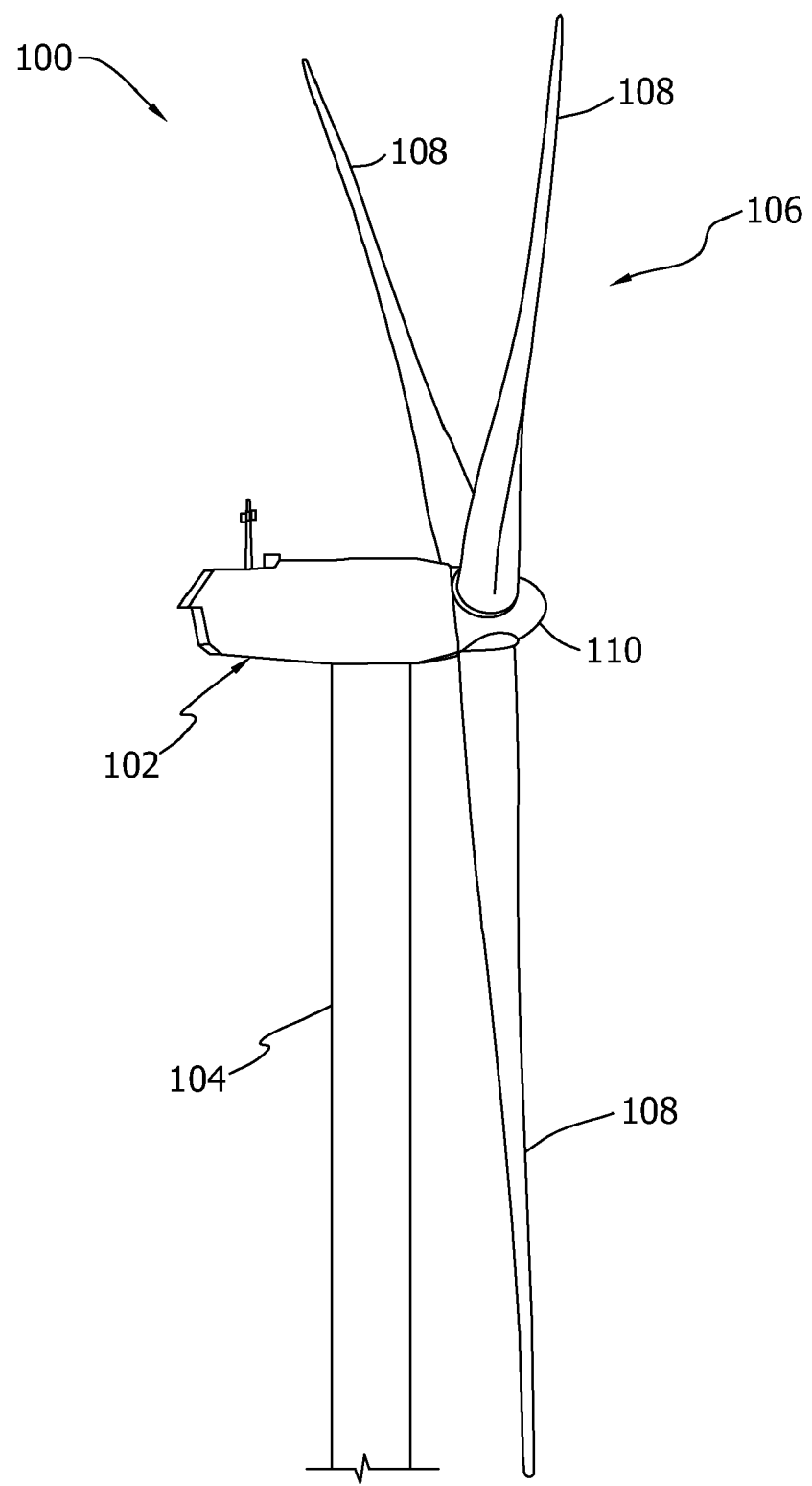
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to a rotor 106 and a generator (not shown in FIG. 1).

Figure 2:
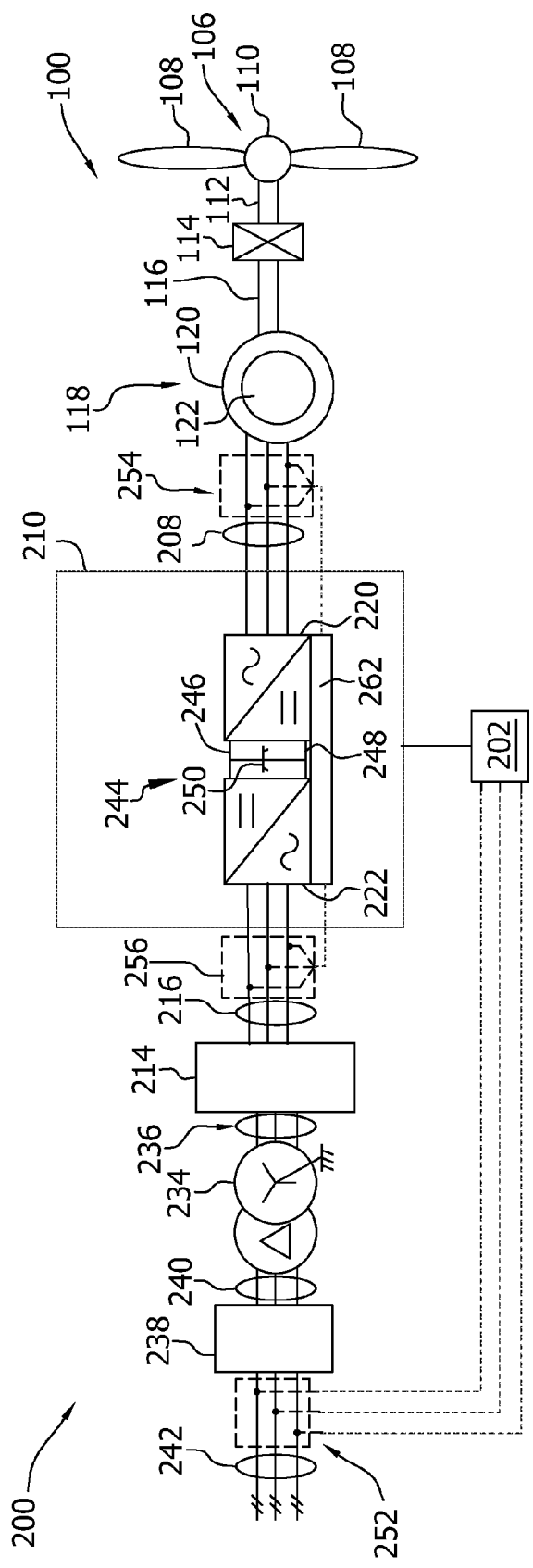
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a permanent magnet, three-phase, synchronous generator that includes a generator stator 120 magnetically coupled to a generator rotor 122. In an embodiment, generator rotor 122 includes a plurality of permanent magnets. In an alternative embodiment, generator 118 may be an induction (asynchronous) generator.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a power conversion assembly 210 via a stator bus 208. In the exemplary embodiment, stator bus 208 transmits three-phase power from generator stator 120 to stator synchronizing switch 206. In the exemplary embodiment, the power conversion assembly 210 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a stator-side power converter 220 electrically coupled to the stator bus 208. The rotor-side power converter 220 is electrically coupled to a line-side power converter 222. Stator-side power converter 220 and line-side power converter 222 are power converter bridges including power semiconductors (not shown). In the exemplary embodiment, stator-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, stator-side power converter 220 and line-side power converter 222 may have a configuration using any switching devices that facilitates operation of electrical and control system 200 as described herein. Power conversion assembly 210 is coupled in electronic data communication with turbine controller 202 to control the operation of stator-side power converter 220 and line-side power converter 222.

In the exemplary embodiment, the system bus 116 electrically couples line-side power converter 222 to the main transformer circuit breaker 214. Alternatively, line-side power converter 222 is electrically coupled to system bus 216 including any suitable protection scheme (not shown). Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, stator-side power converter 220 is coupled in electrical communication with line-side power converter 222 via a single direct current (DC) link 244. Alternatively, stator-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with system bus 212. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has a configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 within generator stator 120. Generator 118 converts the rotational mechanical energy to a sinusoidal, three-phase alternating current (AC) electrical energy signal in generator stator 120. The associated electrical power is transmitted to main transformer 234 via stator bus 208, the power conversion assembly 210, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

Within power conversion assembly 210, the electrical power is transmitted to stator-side power converter 220. Stator-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216.

Main transformer circuit breaker 214, and grid circuit breaker 238 are configured to disconnect corresponding buses, for example, when excessive current flow may damage the components of electrical and control system 200. Additional protection components may be also provided.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, stator bus voltages, electric current sensors 254, grid bus voltages and electric current sensors 252, and system bus voltages and the respective electric current sensors 256. Using this feedback information, and for example, switching control signals, stator synchronizing switch control signals and system circuit breaker control (trip) signals may be generated in any known manner.

Typically, the power conversion assembly 210 may operate in a specific input voltage range that may be converted by the stator side power converter 220 may be between 200 and 5000V, in particular between 500 and 1000V.

Figure 3:
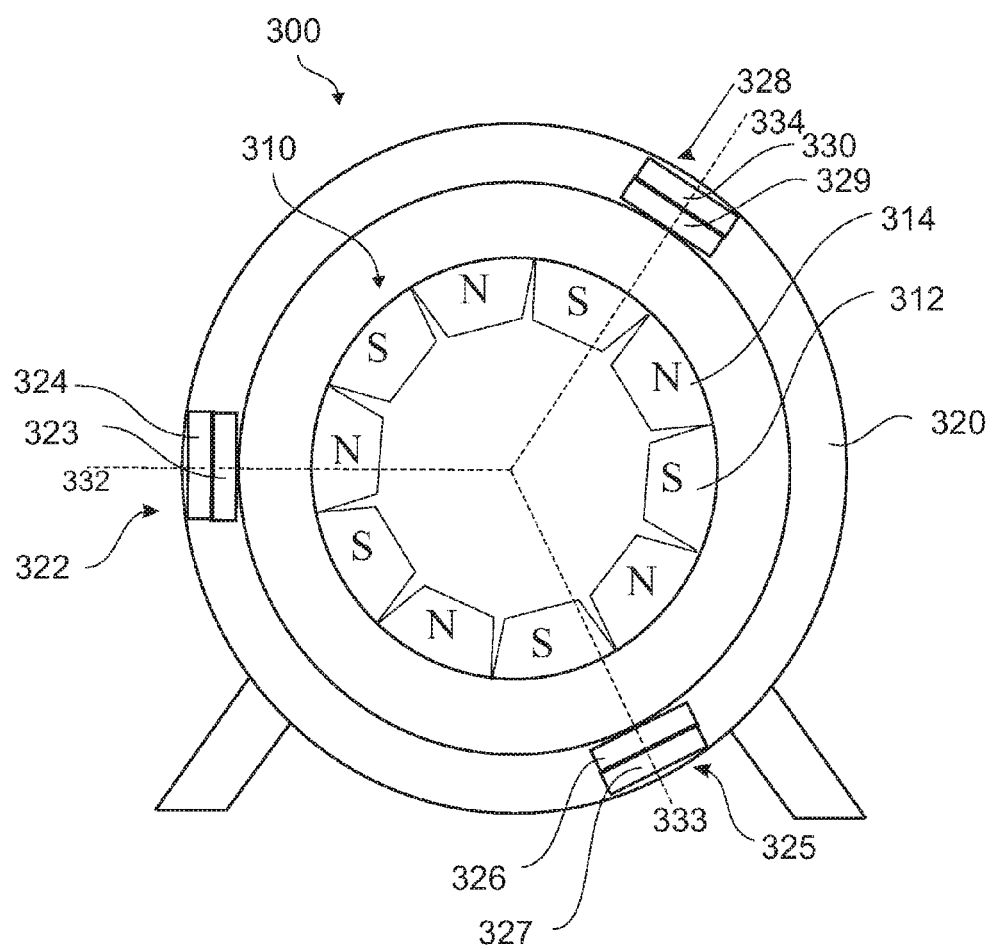
FIG. 3 shows schematically an embodiment of a generator.

FIG. 3 shows schematic drawing of an embodiment of a three phase generator 300. The generator may be a permanent magnet generator, an electrically excited synchronous generator or an asynchronous generator. The generator 300 includes a rotor 310 and a stator 320. The rotor 310 is mechanically connected to the wind rotor 106, in a typical embodiment via a gear box. Thus, when the wind rotor is rotated by the kinetic energy of the wind, the wind rotor drives the rotor 310 of the generator that in turn rotates. The rotor 310 includes at least two permanent magnets 312, 314 wherein the north poles 314 and south poles 312 are alternately arranged on the circumference of the rotor 310. In a further embodiment, the rotor 310 may include more than two permanent magnets. In a further embodiment, the generator may include excitation coils for increasing or reducing the magnetic field of the permanent magnets 312, 314.

In a typical embodiment, the stator includes three coils 322, 325, 328, wherein each phase of a three phase current is connected to a respective winding. In further embodiments, the generator 300 may include more coils, for example two or more coils for each phase. In operation, when the rotor 310 is rotating, it generates a rotating magnetic field. According to the induction law, a voltage is induced in the coils 322, 325, 328 of the stator. Typically, the induced voltage is proportional to the rotational speed of a rotor of the generator. The coils 322, 325, 328 of the stator may be, for example, connected to a circuit breaker, a commutator, or an inverter, as shown in FIG. 2.

Typically, the induced voltage into a coil of a generator is proportional to the number of turns and it is proportional to the rotational speed of the rotor. As shown in FIG. 3, each coil 322, 325, 328 may include at least two subcoils 323, 324, 326, 327, 328, 329 respectively. The subcoils 323, 324, 326, 327, 328, 329 of the respective coils 322, 325, 328 may be connected in series and in parallel. Typically, the subcoils of each coil are arranged coaxially, in particular one after the other, so that they are disposed with respect to the rotating axis of the rotor at a different radial distance. Hence, the subcoils of each coil are arranged on a respective same radius 332, 333, 334. In another embodiment, the form and the placement of the coils, may be adapted such that substantially the same voltage is induced in each subcoil of the stator by the magnetic field of the rotor. For example the diameter of the coil may vary from one subcoil to another subcoil of the same coil.

In a further embodiment, the rotor of the generator may be disposed outside the stator. The arrangement of the stator and the rotor may depend, for example, on the type of the wind turbine and/or the size of the nacelle.

Figure 4:
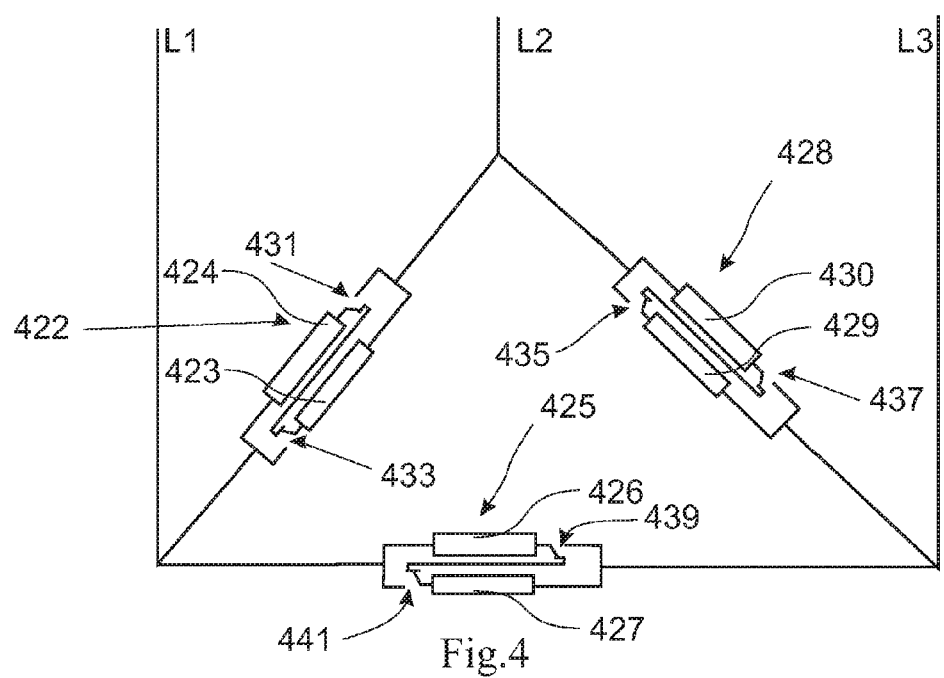
FIG. 4 shows schematically an embodiment of an electric circuit of a stator of a generator in a first state.
Figure 5:
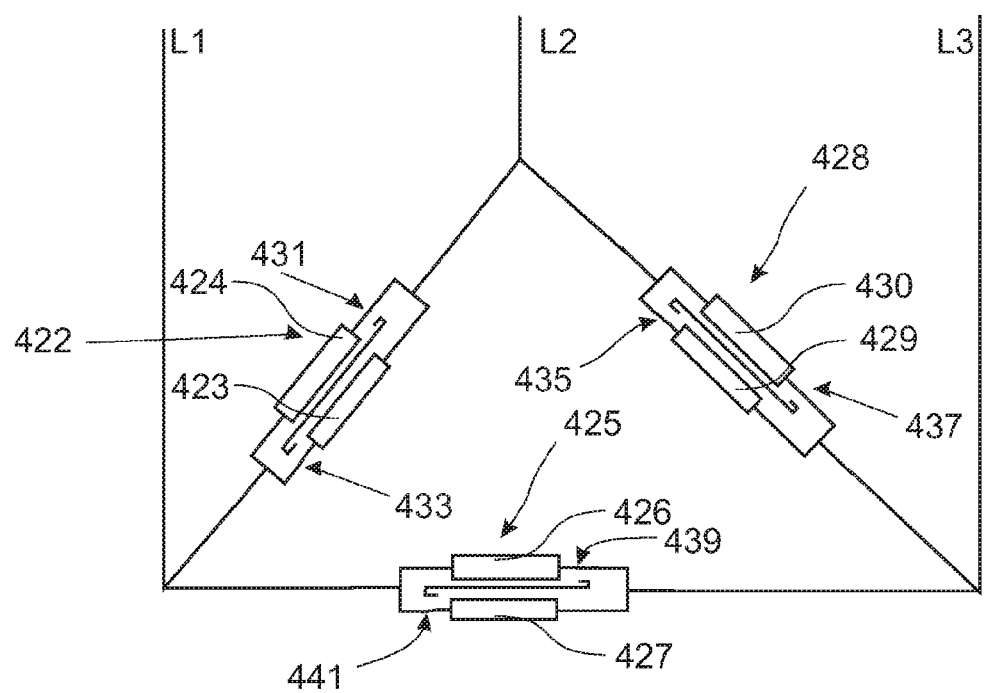
FIG. 5 shows schematically the electric circuit of FIG. 4 in a second state.

FIG. 4 shows a schematically electrical circuit of a generator according to an embodiment. The electrical circuit includes three coils 422, 425, 428, wherein each coil 422, 425, 428 includes two subcoils 423, 424, 426, 427, 428, 429. The coils are connected with three phases L1, L2, L3 in a delta connection. In a further embodiment, the coils 422, 425, 428 may be connected in a star connection to the three phases L1, L2, L3. In a typical embodiment, which may be combined with other embodiments a generator may switch the coils 422, 425, 428 from a star connection to a delta connection and vice versa, in particular depending on the operation conditions of the wind turbine. In FIG. 4, the subcoils are connected in series, such that the two subcoils 423, 424, 426, 427, 428, 429 of each coil 422, 425, 428 form a common coil. Typically the turns of each subcoil 423, 424, 426, 427, 428, 429 of each coil have the same direction for each radial axis of the coils. In FIG. 5 the same electrical circuit is shown as in FIG. 5, but with a parallel connection of the subcoils of each coil 422, 425, 428. Thus, the subcoils 423, 424, 426, 427, 428, 429 of a coil may be switched in parallel or in series depending on the conditions or the condition in which the wind turbine is operated. For switching the subcoils 423, 424, 426, 427, 428, 429 from parallel to a serial connection, each coil 422, 425, 428 includes at least one switch 431, 433, 435, 437, 439, 441. Typically, the switching time may be between 1 and 10 seconds, for example between 2 and 5 seconds.

For example, if the rotational speed of the wind rotor and thus the rotational speed of generator rotor 122, 310 is high, the subcoils 323, 324, 326, 327, 328, 329, 423, 424, 426, 427, 428, 429 of each coil are respectively connected in parallel, such that a high current with a relative low voltage may be produced. If the wind turbine is operated with a low rotational speed of the rotor 106, for each coil 322, 325, 328, 422, 425, 428 the subcoils 323, 324, 326, 327, 328, 329, 423, 424, 426, 427, 428, 429 are connected in series, such that a low current with a high voltage is produced. Thus, the useable range of rotational speeds in which the wind turbine can be operated is increased, by using a serial connection in low rotational speeds of the rotor 106 of the wind turbine 100 and a parallel connection of the subcoils for each coil at high rotational speeds of the wind turbine. For example, the inverter of a wind turbine may be only operated between 500 and 1000 volts. Thus, in the case that a coil, in which the output voltage of the coils would not be high enough so that the inverter may convert the current, the subcoils switched in parallel may be changed to a serial configuration, such that the output voltage is increased.

Figure 6:
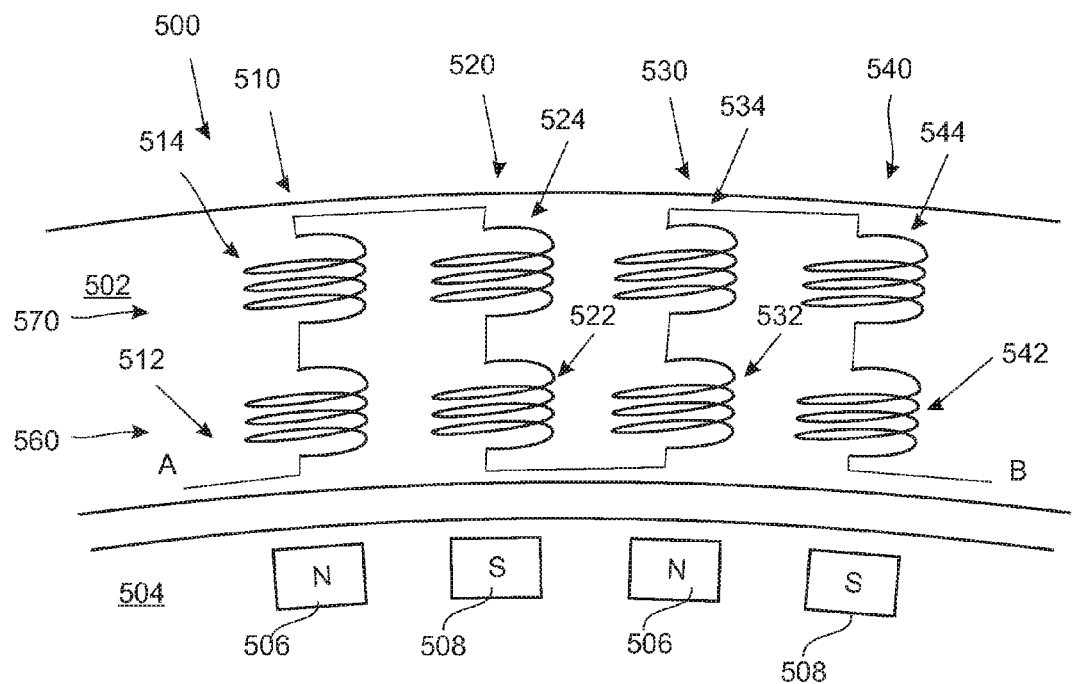
FIG. 6 shows schematically another embodiment of an electric circuit of a stator of a generator in a first state.
Figure 7:
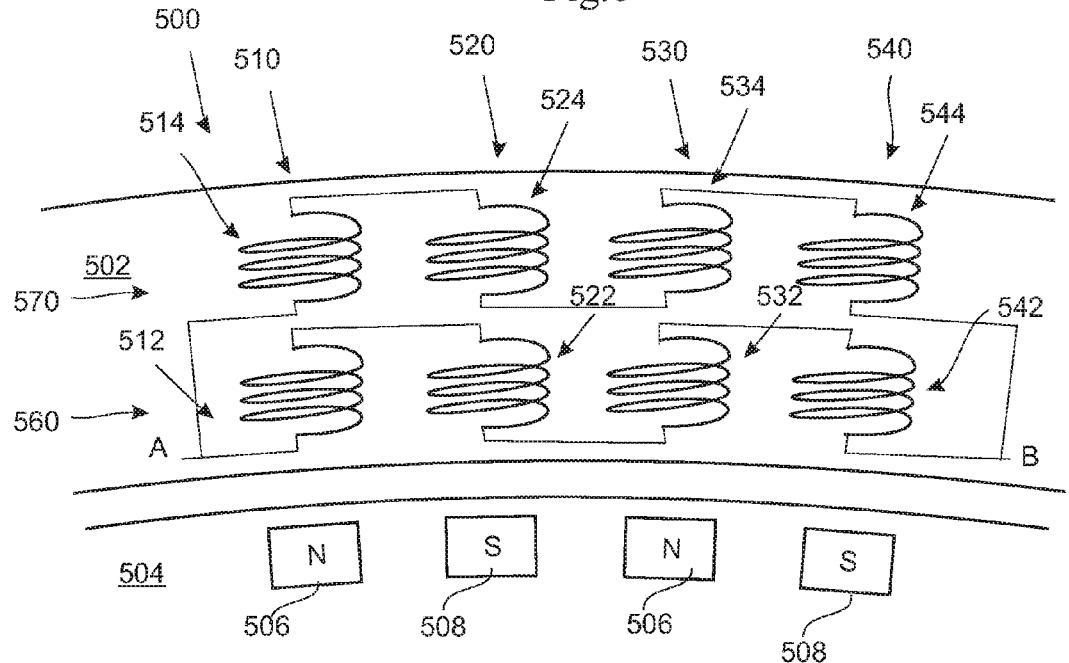
FIG. 7 shows schematically the electric circuit of FIG. 6 in a second state.

FIG. 6 and FIG. 7 show a section of a further embodiment of a schematical electrical circuit of a permanent magnet generator 500. The generator 500 includes a generator stator 502, and a generator rotor 504, wherein the permanent magnets 506, 508 are regularly placed around the circumference of the generator rotor. In particular towards the generator stator 502 the south and north poles of the magnets 506, 508 are disposed alternately.

The generator stator 502 includes a plurality of coils 510, 520, 530, 540 each having two subcoils 512, 514, 522, 524, 532, 534, 542, 544, namely a radial inner subcoil 512, 522, 532, 542 and a radial outer subcoil 514, 524, 534, 544. In FIGS. 6 and 7, the coils of only one phase are shown. The coils of further phases would be placed respectively between two adjacent coils 510, 520, 530, 540. The radial inner subcoils 512, 522, 532, 542 may form a first group of coils 560 and the radial outer subcoils may form a second group of coils 570.

The permanent magnet generator 500 of FIGS. 6 and 7 may have two different states. In a first state, shown in FIG. 6, all coils 510, 520, 530, 540 are electrically connected in series. Further, the subcoils 512, 514, 522, 524, 532, 534, 542, 544 of each coil 510, 520, 530, 540 are electrically connected in series. In a second state shown in FIG. 7, the inner subcoils 512, 522, 532, 542 are connected in series to form a system of inner subcoils and the outer subcoils 514, 524, 534, 544 are connected in series to form a system of outer subcoils. Then the system of inner subcoils and the system of outer subcoils are electrically connected in parallel. In each state the subcoils 512, 514, 522, 524, 532, 534, 542, 544 or coils 510, 520, 530, 540 of one phase are disposed such that substantially the same voltage is induced into the coils by the magnets 506, 508 of the generator rotor 504. If the rotor is rotating with the same speed in the first and the second state, the voltage $U_{AB}$ between the points A and B of the electric circuit in the first state is higher than the voltage $U_{AB}$ between the points A and B of the electric circuit in the second state. In the second state first group of coils 560 is connected in parallel to the second group of coils 570.

Figure 8:
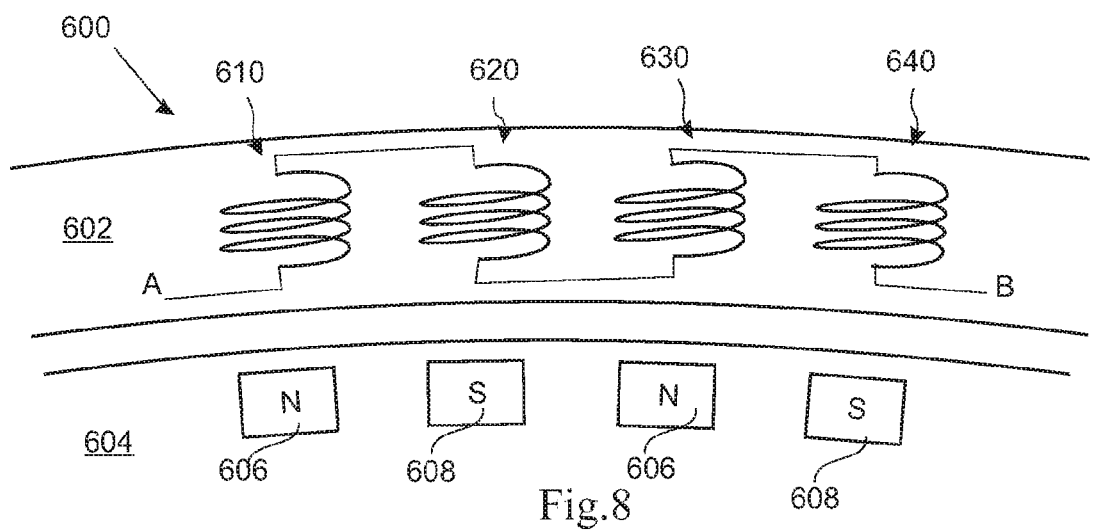
FIG. 8 shows schematically a further embodiment of an electric circuit of a stator of a generator in a first state.
Figure 9:
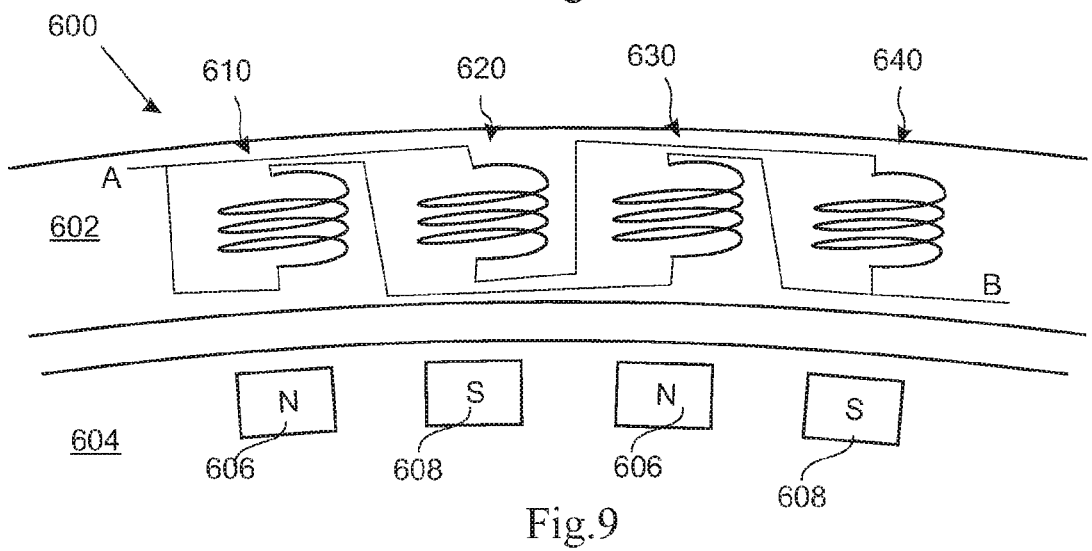
FIG. 9 shows schematically the electric circuit of FIG. 8 in a second state.
Figure 10:
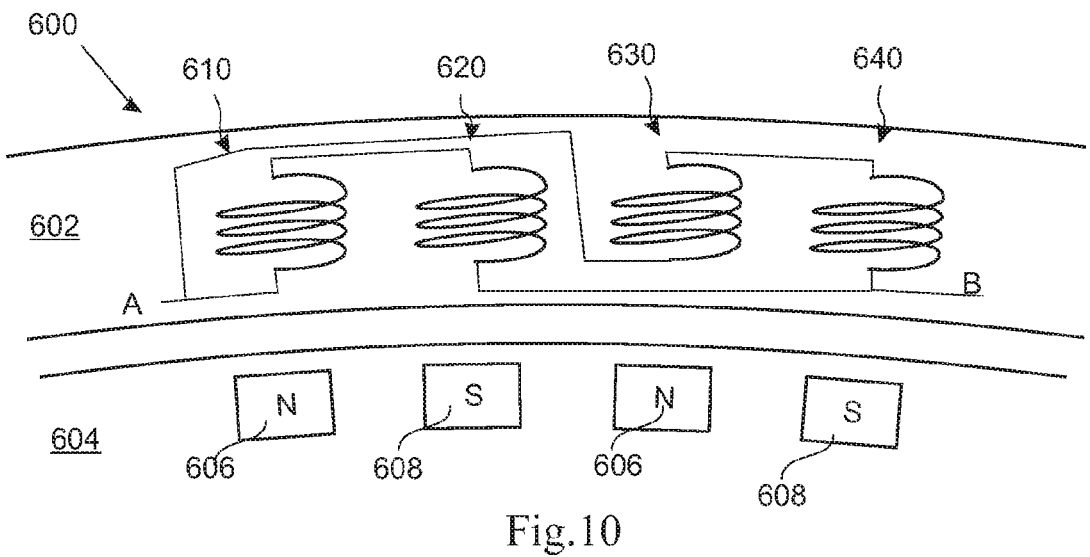
FIG. 10 shows schematically the electric circuit of FIG. 8 in a third state.

FIG. 8 to FIG. 10 show a section of a further embodiment of a schematical electrical circuit of a permanent magnet generator 600. The generator 600 includes a generator stator 602 and a generator rotor 604, wherein the permanent magnets 606, 608 are regularly placed around the circumference of the generator rotor. In particular towards the generator stator 602, the south and north poles of the magnets 606, 608 are disposed alternately.

The generator stator 602 includes a plurality of coils 610, 620, 630, 640. In FIGS. 8 to 10 the coils of only one phase are shown. The coils of further phases would be placed respectively between two adjacent coils 610, 620, 630, 640. Typically, the coils 610, 620, 630, 640 of one phase are disposed such that substantially the same voltage is induced into the coils by the magnets 606, 608 of the generator rotor 604.

The permanent magnet generator 500 of FIGS. 8 to 10 may have three different states. In a first state, shown in FIG. 8, all coils 510, 520, 530, 540 are electrically connected in series. In a second and a third state shown in FIGS. 9 and 10 the coils are separated in a first group of coils and a second group of coils, each group of coils includes the half of the coils of the respective phase. The coils within each group of coils are electrically connected in series, and the first and the second group of coils are electrically connected in parallel. In FIG. 9 showing a second state of the permanent magnet generator 500, a first group of coils includes every second coil 610, 630 in a circumferential direction of the same phase, and a second group of coils includes the remaining coils 620, 640 of the same phase. In FIG. 10, the first group of coils may include half of the coils of a phase, wherein the coils are disposed adjacent to each other—for example the coils of one phase disposed on a first half of a circumference of the stator—and the second group of coils may include the remaining half of coils of the phase—for example the coils of the phase disposed on a second half of the circumference of the stator.

If the rotor is rotating with the same speed in the first, second state and third state, the voltage $U_{AB}$ between the points A and B of the electric circuit in the first state is higher than the voltage $U_{AB}$ between the points A and B of the electric circuit in the second state and the third state. Typically the voltage $U_{AB}$ in the first state would be twice the voltage $U_{AB}$ in the second and the third state.

In FIGS. 6 to 10 only four coils of a phase are shown for the sake of simplicity, but the electrical connections between the coils of the first, second and third state of the permanent magnet generator may be also realized with more coils. Also more than two groups of coils or subcoils may be provided for realizing more possibilities to adapt to output voltage of the permanent magnet generator.

According to a typical embodiment, a method is disclosed wherein the windings of a generator, in particular a permanent magnet generator, are switched to step up the output voltage level from parallel to series. Thus, the idea is to connect a contactor into the generator system in such a way that the windings may be switched in parallel or series. This may enlarge the usable operating range of the speed variable generator system. If the windings are switched in series the output voltage of the generator will be doubled, in particular in case of subcoils having the same amount of turns. The speed range of a wind turbine may be enlarged into a lower speed range, such that it may optimize the power coefficient (Cp) factor of the wind turbine. Typically, the converter of the wind turbine may stay longer productive into low speed areas.

Figure 11:
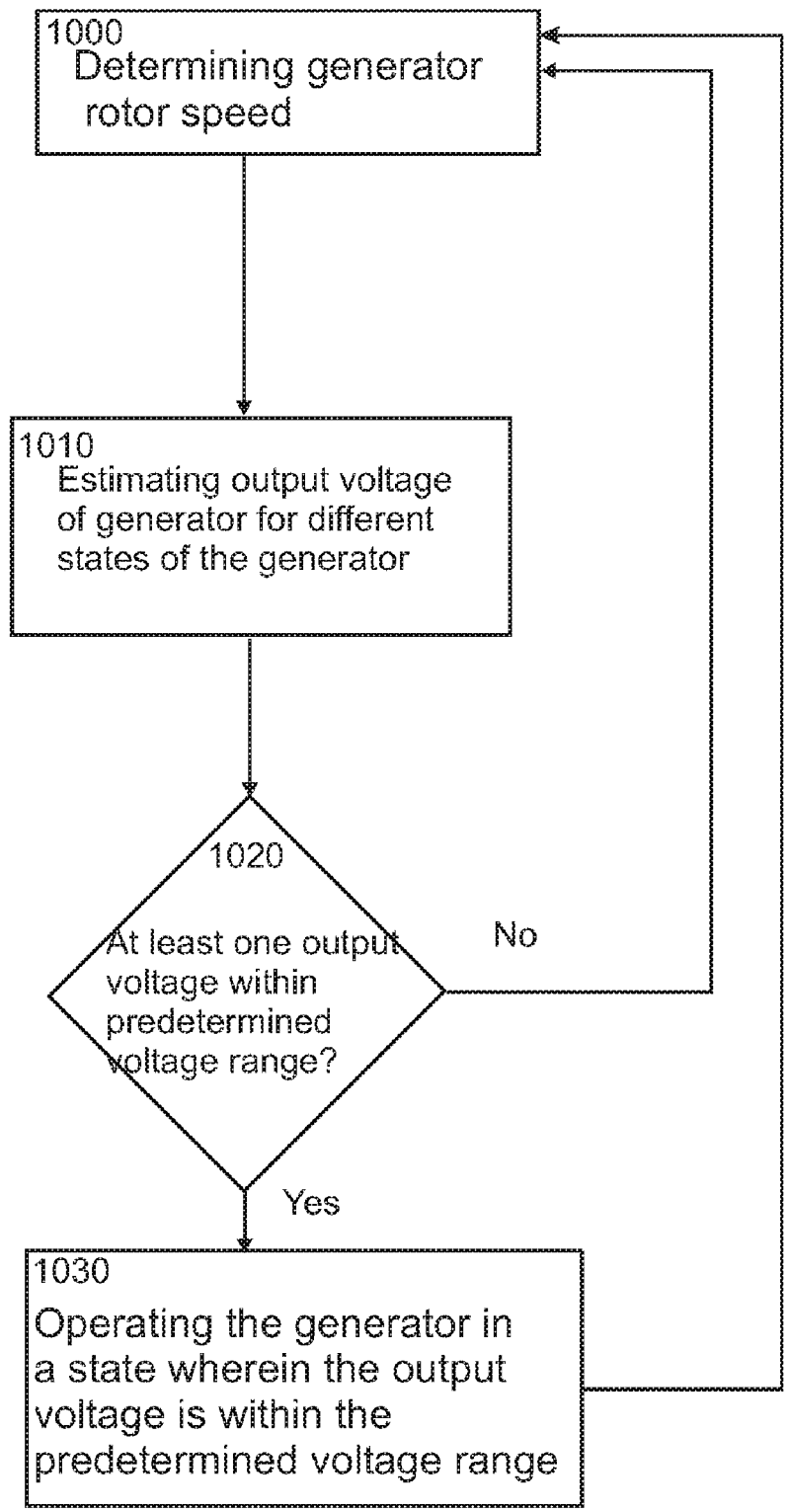
FIG. 11 shows a flow chart of an embodiment of a method for operating a wind turbine.

In FIG. 11 a flowchart of a method is shown. Typically, the rotational speed of the rotor of the generator is determined (Box 1000), such that the output voltage of the generator in different states of the generator may be estimated (Box 1010). Typically, the different states include for example different connections of the coils and/or subcoils of the generator, for example the states shown in the embodiments of FIGS. 6 to 10. The calculated output voltage of the different states is compared with at least one predetermined voltage range, which may be for example the upper and lower end of the operating range of the power converter of the wind turbine (Box 1020). If the generator may be operated in at least one state such that the output voltage is within the predetermined voltage range, the generator is operated in that state (Box 1030). Then, the process may start again at Box 1000. Also other voltages may be used as reference threshold voltages or voltage ranges, for example a minimum voltage to be fed into the grid.

In a typical embodiment, during rotation of a rotor of the generator, substantially the same voltage is induced in each coil of the same phase.

In a further embodiment, the method according to an embodiment disclosed herein may include determining the generator speed.

In a typical embodiment, a method according to an embodiment, which may be combined with another embodiment disclosed herein, may include generating a signal for changing the state of the generator if a rotational speed of the generator rotor exceeds or goes below a predetermined threshold rotational speed.

In a typical embodiment, a method may include generating the signal for changing the state if a reference voltage exceeds or goes below a predetermined threshold voltage, wherein the reference voltage is selected from at least one voltage selected from a group consisting of a voltage of a coil, a voltage of a group of coils, a voltage of a subgroup, and a magnet wheel voltage. Typically the voltage of a coil, of a group of coils, of subgroup of coils is the voltage that can be measured between the two ends of coil, the group of coils or the subgroup of coils In a further embodiment, the threshold voltage depends on at least one voltage selected of the group consisting of a minimum input voltage of a converter of the wind turbine, a maximum input voltage of the converter of the wind turbine, minimum output voltage of the converter of the wind turbine, a maximum output voltage of the converter of the wind turbine, a minimum input voltage of a power electronic device, a maximum input voltage of the power electronic device, a minimum output voltage of the power electronic device, and a maximum output voltage of the power electronic device. In a typical embodiment, which may be combined with other embodiments disclosed herein, the power electronic device is disposed in the electric system of the wind turbine, in particular three phase electric system of the wind turbine. Typically, portions of the electric system of the wind turbine may be placed in a separate control cabinet outside the tower of the wind turbine.

In a typical embodiment, the generator is a permanent magnet generator.

In a further embodiment, the generator is a three-phase generator.

In a typical embodiment, which may be combined with other embodiments disclosed herein, the coils of the subgroups have substantially the same number of turns.

In a further embodiment, which may be combined with other embodiments disclosed herein, during rotation of a rotor of the electrical machine, substantially the same voltage is induced in each coil of the same phase.

In a typical embodiment, the coils of the subgroups have substantially the same number of turns.

In a further embodiment, which may be combined with other embodiments disclosed herein, the coil arrangement is disposed in a stator of an electrical machine.

In a typical embodiment, the electrical machine is a permanent magnet three-phase machine.

In a further embodiment, which may be combined with other embodiments disclosed herein, the axes of the coils of the respective subgroups are disposed on the same radius of the electrical machine. Typically, electrical machine as a rotational axis, around which the generator rotor rotates. Thus, the radius of the electrical machine extends radially from the rotational axis of the electrical machine.

In a typical embodiment, which may be combined with other embodiments disclosed herein, the controller is adapted to generate a signal for changing the state of the generator if the rotational speed of the generator rotor exceeds or goes below a predetermined threshold rotational speed.

In another embodiment, which may be combined with other embodiments disclosed herein, the controller is adapted to generate a signal for changing the state if a reference voltage exceeds or goes below a predetermined threshold voltage, wherein the reference voltage is selected from at least one voltage selected from a group consisting of a voltage of a coil, a voltage of a group of coils, a voltage of a subgroup, and a magnet wheel voltage.

This written description uses examples, including the best mode, to enable any person skilled in the art to make and use the described subject-matter. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine having a generator, the generator comprising for each phase a plurality of coils, wherein the plurality of coils of each phase includes at least one group of coils including at least two coils, the group of coils including at least two subgroups including at least one coil, wherein the generator has a first state in which the coils of the group of coils are electrically connected in series, and, the generator has a second state in which the at least two subgroups are switched electrically in parallel; the method comprising:

changing the state of the generator.

2. The method according to claim 1, wherein during rotation of a rotor of the generator, inducing substantially the same voltage in each coil of the same phase.

3. The method according to claim 1, further comprising determining the generator speed.

4. The method according to claim 1, wherein the method further comprises generating a signal for changing the state of the generator if a rotational speed of a rotor of the generator exceeds or goes below a predetermined threshold rotational speed.

5. The method according to claim 1, wherein the method further comprises generating a signal for changing the state if a reference voltage exceeds or goes below a predetermined threshold voltage, wherein the reference voltage is selected from at least one voltage selected from a group consisting of a voltage of a coil, a voltage of a group of coils, a voltage of a subgroup, and a magnet wheel voltage.

6. The method according to claim 5, wherein the threshold voltage depends on at least one voltage selected of the group consisting of a minimum input voltage of a converter of the wind turbine, a maximum input voltage of the converter of the wind turbine, a minimum output voltage of the converter of the wind turbine, a maximum output voltage of the converter of the wind turbine, a minimum input voltage of a power electronic device, a maximum input voltage of the power electronic device, a minimum output voltage of the power electronic device, and a maximum output voltage of the power electronic device.

7. The method according to claim 1, wherein the generator is a permanent magnet generator.

8. The method according to claim 1, wherein the generator is a three-phase generator.

9. The method according to claim 1, wherein the coils of the subgroups have substantially the same number of turns.

10. A coil arrangement for an electric machine for a wind turbine, the electrical machine comprising for each phase a plurality of coils, wherein the plurality of coils of each phase includes at least one group of coils including at least two coils, the group of coils including at least two subgroups including at least one coil, wherein the electrical machine has a first state in which the coils of the group of coils are electrically connected in series, and, the electrical machine has a second state in which the at least two subgroups are switched electrically in parallel.

11. The coil arrangement according to claim 10, wherein during rotation of a rotor of the electrical machine, substantially the same voltage is induced in each coil of the same phase.

12. The coil arrangement according to claim 10, wherein the coils of the subgroups have substantially the same number of turns.

13. The coil arrangement according to claim 10, wherein the coil arrangement is disposed in a stator of an electrical machine.

14. The coil arrangement according to claim 10, wherein the electrical machine is a permanent magnet three-phase machine.

15. The coil arrangement according to claim 10, wherein the axes of the coils of the respective subgroups are disposed on the same radius of the electrical machine.

16. A controller for a wind turbine, the wind turbine comprising a generator, the generator having for each phase a plurality of coils, wherein the plurality of coils of each phase includes at least one group of coils including at least two coils, the group of coils including at least two subgroups including at least one coil, wherein the generator has a first state in which the coils of the group of coils are electrically connected in series, and, the generator has a second state in which the at least two subgroups are switched electrically in parallel; wherein the controller is adapted to generate a signal for changing the state of the generator.

17. The controller of claim 16, wherein the controller is adapted to generate a signal for changing the state of the generator if a rotational speed of a rotor of the generator exceeds or goes below a predetermined threshold rotational speed.

18. The controller according to claim 16, wherein the controller is adapted to generate a signal for changing the state if a reference voltage exceeds or goes below a predetermined threshold voltage, wherein the reference voltage is selected from at least one voltage selected from a group consisting of a voltage of a coil, a voltage of a group of coils, a voltage of a subgroup, and a magnet wheel voltage.

19. The controller according to claim 18, wherein the threshold voltage depends on at least one voltage selected from a group consisting of a minimum input voltage of a converter of the wind turbine, a maximum input voltage of the converter of the wind turbine, a minimum output voltage of the converter of the wind turbine, a maximum output voltage of the converter of the wind turbine, a minimum input voltage of a power electronic device, a maximum input voltage of the power electronic device, a minimum output voltage of the power electronic device, and a maximum output voltage of the power electronic device.

20. The controller according to claim 16, wherein the coils of the subgroups have substantially the same number of turns.

* * * * *